J. C. DAVIS.
APPARATUS FOR HANDLING MOLTEN STEEL.
APPLICATION FILED SEPT. 27, 1915.
1,223,479.
Patented Apr. 24, 1917.
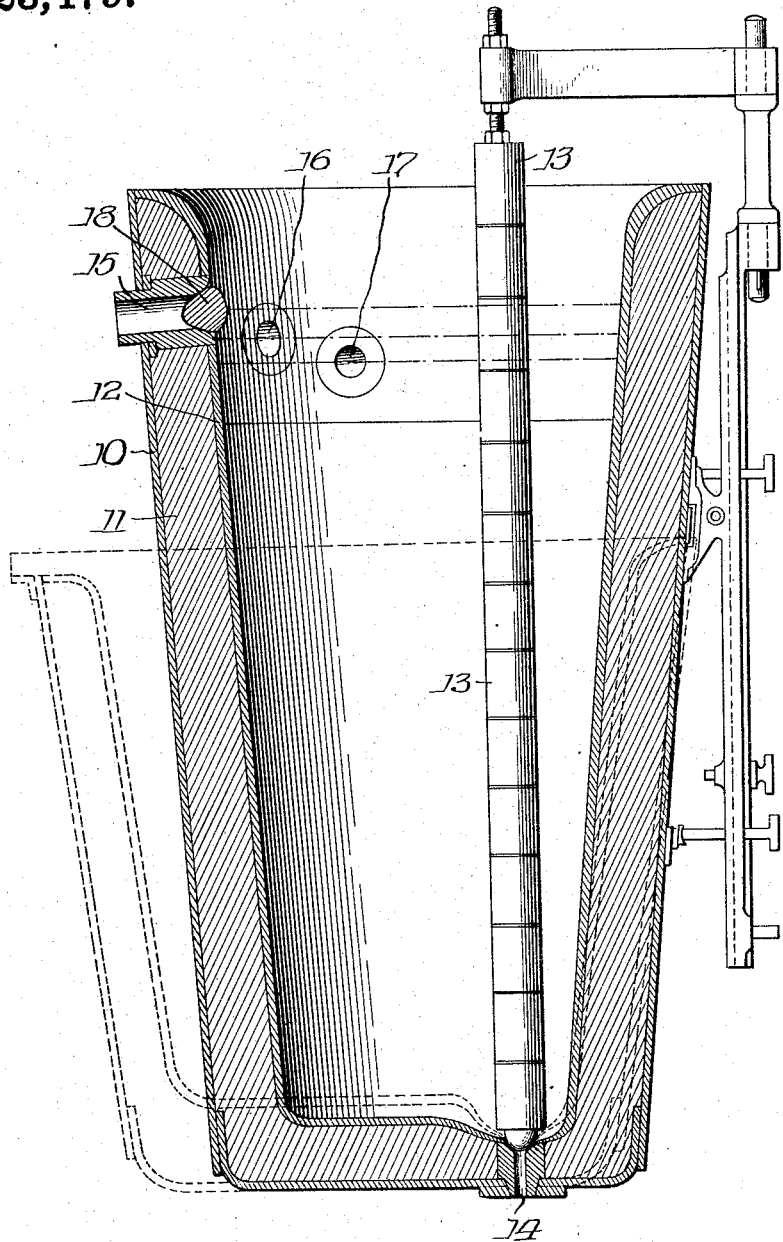
Witnesses:
Inventor:
James C. Davis
By C. C. Linthicum
Atty.

UNITED STATES PATENT OFFICE.

JAMES C. DAVIS, OF HINSDALE, ILLINOIS, ASSIGNOR TO AMERICAN STEEL FOUNDRIES, OF NEW YORK, N. Y., A CORPORATION OF NEW JERSEY.

APPARATUS FOR HANDLING MOLTEN STEEL.

1,223,479. Specification of Letters Patent. Patented Apr. 24, 1917.

Application filed September 27, 1915. Serial No. 52,840.

*To all whom it may concern:*

Be it known that I, JAMES C. DAVIS, a citizen of the United States, and resident of Hinsdale, in the county of Dupage and State of Illinois, have invented certain new and useful Improvements in Apparatus for Handling Molten Steel, of which the following is a specification.

My invention relates to the art of producing steel and has particular reference to a novel ladle for use in connection therewith.

The most universally employed medium for the production of basic steel is the regenerative open hearth furnace. The proper adjustment of the metalloids in this furnace under skilled manipulation is a comparatively simple matter, but when the contents of the furnace shall have been discharged into a ladle there ceases the opportunity for the further practical manipulation or treatment of the slag condition. It is understood of course that one of the important features of these chemical reactions is the element of time, and in the event of a ladle containing five or more tons of basic steel which is to be discharged therefrom in small individual quantities, and over a period of time varying from twenty minutes in the case of a minimum quantity to say one hour and twenty minutes for twenty-five tons, there is given opportunity for the combination of calcium with the silicon in the steel and a resulting interchange of phosphorus which reënters the steel in the ladle. The effect of the loss of silicon from the steel to the slag is to liberate oxygen, thus causing the steel to be porous when it shall have been cast to form and become cold, and through the return of phosphorus from the slag to the steel the latter is rendered brittle and unfit for use if the steel in its ultimate form is expected to be subjected to severe shocks or strains.

It is not always possible to produce an exact quantity of steel of desirable chemical composition in an open hearth furnace at one time owing to various delays which make necessary the addition of more metal than was contemplated in the original furnace charge. It is obviously necessary therefore that the ladle into which the steel and slag are to be discharged from the furnace must be of such ample proportions as to properly receive and contain not only the original charge but such additional amounts of metal which may be found necessary to charge owing to the exigencies of such operations. Therefore when a heat of steel of normal proportions shall have been discharged into a ladle there is so much space between the top of the steel and the top of the ladle that the ladle receives an excessive amount of slag, which slag remains superimposed upon the metal until the latter shall have been completely discharged from the ladle in the act of filling the molds for which the metal is intended. It will be seen from this that the greater the volume of slag contained in the ladle the greater is the hydrostatic head or pressure exerted by the slag, thereby causing the slag to settle more deeply into the steel and therefore increasing the contaminating effect of the slag as before mentioned. Furthermore it is universally the practice to design such ladles somewhat in the shape of a bowl or, in other words, a ladle is usually designed so that its height is but little greater than the inside diameter. It will be seen from this that an unusually large amount of metal is exposed to the influences of the slag; the only function of the latter in the ladle being to protect the top of the steel from the cooling influences of the atmosphere.

It is obvious then that, first, the amount of slag which is permitted to be superimposed on the metal should be under definite control and second, that the area of metal exposed to the slag should be controlled at a minimum. With these objects in view I have designed a ladle which contains near the top thereof a series of openings, located at different heights in and penetrating through both the ladle lining and shell. The reason these openings are located at different heights is to compensate for varying amounts of steel which may be discharged from the furnace into the ladle. During this discharge the openings are closed by means of a stopper of any suitable material, preferably composed of silica sand mixed with a small amount of bonding material.

After the ladle shall have been filled, any or all of the said stoppers or plugs may be removed, permitting the slag to be drained from the top of the ladle down to any level permitted by the openings, the ladle as a result containing just sufficient slag to obviate exposure of the steel to the chilling influences of the atmosphere, but with an amount not great enough to cause serious contamination of the metal.

In addition to these drains or openings for disposal of the slag, I have designed a ladle which, while it has the same cubical contents as ladles ordinarily in use, has a radically different disposition of the contents in that the cross sectional area of the interior of the ladle is reduced so that the area of steel exposed to the slag in the top of the ladle is at least 45% less than is the universal practice. A further advantage which is derived from this design of ladle is the greatly increased hydrostatic head which is exerted by the metal contained therein, and for any given volume of metal this greater pressure having the effect of causing the lighter slag to float to the top of the metal and remain there throughout the process of discharging the latter from the ladle.

The resulting effect of this invention is that the last of the steel to leave the ladle is practically of the same quality as the first which is discharged therefrom, and all of the castings which are formed from the steel originally contained in the ladle are equal in solidity and physical characteristics. In the application of the principles involved herein they are especially effective in the handling of steel in quantities of say five tons or over.

The invention will be more readily understood by reference to the accompanying drawing in which the figure is a vertical section through a ladle constructed in accordance with my invention, showing in dotted lines the shape of a ladle of similar capacity and such as now commonly in use.

The ladle as shown may be of the usual construction, that is, an exterior shell 10, a brick lining 11, and a thinner lining 12, of material containing magnesite and dolomite. It is provided with the usual stopper 13, which controls the pouring opening 14, and near its upper end is provided with a plurality of (in this case three) openings 15, 16, 17. Before the metal is discharged into the ladle from the furnace all of the openings are plugged as by the lump 18. If it be found that the quantity of metal in the furnace will not fill the ladle but will reach a point below the lower opening 17, one or all of the plugs 18, are forced away from the openings and the slag other than that necessary to blanket the metal is permitted to flow out through the openings. Of course in the case of a large heat the metal may reach above the openings, in which case any excess of slag will flow over the top of the ladle.

By reference to the dotted lines in the figure it will be seen that the ladle which I prefer to use is of considerably increased height over that of the commonly employed ladle and of reduced cross sectional area, the total capacity of the two ladles being substantially equal. By this means I am enabled to handle the required amount of metal without exposing a large area thereof to the action of the slag and by the further modification I am enabled to dispose of any surplus slag which might by hydrostatic pressure tend to combine with the metal adjacent thereto. Furthermore, by the construction of the ladle in the manner described, I am enabled to maintain a greater head of material thereby accentuating the difference in specific gravity between the slag and the metal and force any slag and the lighter metalloids to the top of the ladle.

I claim:

1. A ladle provided with a plurality of openings in its side wall near its upper end, said openings being spaced apart vertically and means for plugging said openings substantially as described.

2. A ladle having a plurality of slag openings near its upper end, said openings being spaced apart vertically and horizontally and means for plugging said openings, substantially as described.

JAMES C. DAVIS.

Witnesses:
 Geo. G. Floyd,
 J. F. Lynn.